US008218822B2

(12) United States Patent
Sefton

(10) Patent No.: US 8,218,822 B2
(45) Date of Patent: Jul. 10, 2012

(54) APPARATUS AND METHOD FOR RECOGNIZING THE STATE OF ORIGIN OF A VEHICLE LICENSE PLATE

(75) Inventor: Alan K. Sefton, Knoxville, TN (US)

(73) Assignee: Pips Technology, Inc., Knoxville, TN (US)

( * ) Notice: Subject to any disclaimer, the term of this patent is extended or adjusted under 35 U.S.C. 154(b) by 860 days.

(21) Appl. No.: 12/120,375

(22) Filed: May 14, 2008

(65) Prior Publication Data

US 2008/0285804 A1 Nov. 20, 2008

Related U.S. Application Data

(60) Provisional application No. 60/917,802, filed on May 14, 2007.

(51) Int. Cl.
*G06K 9/00* (2006.01)
(52) U.S. Cl. ......... 382/105; 382/104; 382/162; 382/165
(58) Field of Classification Search .................. 382/104, 382/162, 165, 105
See application file for complete search history.

(56) References Cited

U.S. PATENT DOCUMENTS

| | | | |
|---|---|---|---|
| 4,268,179 A | 5/1981 | Long et al. | |
| 4,368,979 A | 1/1983 | Ruell | |
| 4,491,923 A | 1/1985 | Look | |
| 4,603,390 A | 7/1986 | Mehdipour et al. | |
| 4,605,846 A | 8/1986 | Duret et al. | |
| 4,611,292 A | 9/1986 | Ninomiya et al. | |
| 4,908,500 A | 3/1990 | Baumberger | |
| 4,958,064 A | 9/1990 | Kirkpatrick | |
| 4,970,389 A | 11/1990 | Danforth et al. | |
| 5,034,739 A | 7/1991 | Gruhl | |
| 5,091,727 A | 2/1992 | Mahmood | |

(Continued)

FOREIGN PATENT DOCUMENTS

AU 2004231240 12/2004

(Continued)

OTHER PUBLICATIONS

Speed Check Services, How Does SPECS Work, www.speedcheck.co.uk, Jun. 14, 2005.

(Continued)

*Primary Examiner* — Jingge Wu
*Assistant Examiner* — Shefali Goradia
(74) *Attorney, Agent, or Firm* — Luedeka Neely Group, P.C.

(57) ABSTRACT

A system analyzes various design characteristics of a vehicle license plate, including character size, placement and color, to identify the state of issuance of the plate. In some embodiments, the system uses spectral properties of light reflected from a vehicle license plate to determine spectral frequency bands having the best contrast between characters on the plate and the background of the plate. For example, red characters against a white background exhibit high contrast levels at wavelengths of about 420 nm to about 595 nm. Green characters against a white background exhibit high contrast levels at wavelengths of about 600 nm to about 750 nm. Blue characters against a white background exhibit high contrast levels at wavelengths of about 550 nm to about 750 nm. Thus, spectral characteristics in combination with other design-related characteristics of a license plate may be used to identify the state of origin of the plate. Once the state of origin is identified, origin-specific syntax matching may be used to enhance optical character recognition routines.

18 Claims, 15 Drawing Sheets

U.S. PATENT DOCUMENTS

| | | | | |
|---|---|---|---|---|
| 5,237,164 | A | 8/1993 | Takada | |
| 5,381,155 | A | 1/1995 | Gerber | |
| 5,432,508 | A | 7/1995 | Jackson | |
| 5,436,437 | A | 7/1995 | Ho | |
| 5,521,815 | A | 5/1996 | Rose | |
| 5,525,883 | A | 6/1996 | Avitzour | |
| 5,585,616 | A | 12/1996 | Roxby et al. | |
| 5,682,030 | A | 10/1997 | Kubon | |
| 5,734,343 | A | 3/1998 | Urbish et al. | |
| 5,805,209 | A | 9/1998 | Yuge et al. | |
| 5,877,969 | A | 3/1999 | Gerber | |
| 5,915,032 | A | 6/1999 | Look | |
| 5,926,210 | A | 7/1999 | Hackett et al. | |
| 5,940,481 | A | 8/1999 | Zeitman | |
| 6,081,206 | A | 6/2000 | Kielland | |
| 6,107,942 | A | 8/2000 | Yoo et al. | |
| 6,142,372 | A | 11/2000 | Wright | |
| 6,213,393 | B1 | 4/2001 | Streicher et al. | |
| 6,243,029 | B1 | 6/2001 | Tomer | |
| 6,339,651 | B1 | 1/2002 | Tian et al. | |
| 6,340,935 | B1 | 1/2002 | Hall | |
| 6,374,240 | B1 * | 4/2002 | Walker et al. | 705/15 |
| 6,426,708 | B1 | 7/2002 | Trajkovic et al. | |
| 6,448,889 | B1 | 9/2002 | Hudson | |
| 6,493,676 | B1 | 12/2002 | Levy | |
| 6,630,893 | B2 | 10/2003 | Schuette | |
| 6,650,765 | B1 * | 11/2003 | Alves | 382/105 |
| 6,690,294 | B1 | 2/2004 | Zierden | |
| 6,747,687 | B1 | 6/2004 | Alves | |
| RE38,626 | E | 10/2004 | Kielland | |
| 6,807,464 | B2 | 10/2004 | Yu et al. | |
| 6,832,728 | B2 | 12/2004 | Kennedy | |
| 6,847,965 | B2 * | 1/2005 | Walker et al. | 1/1 |
| 6,885,311 | B2 | 4/2005 | Howard et al. | |
| 6,885,312 | B1 | 4/2005 | Kirkpatrick | |
| 6,892,942 | B1 | 5/2005 | Widl et al. | |
| 6,982,654 | B2 * | 1/2006 | Rau et al. | 340/937 |
| 7,119,674 | B2 | 10/2006 | Sefton | |
| 7,136,522 | B2 * | 11/2006 | Harrington et al. | 382/166 |
| 7,440,637 | B2 * | 10/2008 | Schechner et al. | 382/284 |
| 7,655,894 | B2 * | 2/2010 | Schofield et al. | 250/208.1 |
| 2004/0036573 | A1 | 2/2004 | Fitzgibbon et al. | |
| 2004/0071341 | A1 * | 4/2004 | Mahdi et al. | 382/164 |
| 2004/0165750 | A1 | 8/2004 | Chew | |
| 2004/0199785 | A1 | 10/2004 | Pederson | |
| 2005/0169367 | A1 | 8/2005 | Venetianer et al. | |
| 2007/0069921 | A1 | 3/2007 | Sefton | |

FOREIGN PATENT DOCUMENTS

| | | | |
|---|---|---|---|
| BE | 1014680 | | 3/2004 |
| CA | 2248347 | | 10/1997 |
| CA | 2260925 | | 1/1998 |
| CA | 2346908 | | 4/2000 |
| CA | 2361583 | | 8/2000 |
| DE | 19650756 | | 6/1997 |
| EP | 0416742 | | 3/1991 |
| EP | 0494815 | | 7/1992 |
| EP | 0547197 | | 1/1993 |
| EP | 1087360 | | 3/2001 |
| EP | 1513125 | | 3/2005 |
| FR | 2802004 | | 6/2001 |
| GB | 2248994 | A | 4/1992 |
| GB | 2280027 | | 1/1995 |
| GB | 2332322 | B | 3/2001 |
| JP | 2001291187 | | 10/2001 |
| WO | 9203808 | | 3/1992 |
| WO | 9511496 | | 4/1995 |
| WO | 9936836 | | 7/1999 |
| WO | 0135372 | | 5/2001 |
| WO | 03088179 | | 10/2003 |
| WO | 2004006184 | | 1/2004 |

OTHER PUBLICATIONS

Speed Check Services, Traffic Safety—SPECS Safety Cameras, www.speedcheck.co.uk, Jul. 2000.
407 Express Toll Route (ETR), Ontario, Canada.
Coyle, Daniel, Welcome to the Real Data Superhighway, Jan. 1997, BYTE.com.
E-470 Public Highway Authority, E-470 Toll Violations.
Shattenstein, Amiel, An Innovative Traffic and Parking Access Control/Management System for Campuses, 2001, Isarel.
Vitron, Video Identification System (VIS), Sep. 1993.
Reefe, Mark C., LPR Technology Makes Recording License Plates a Snap, Dec. 2001, 1-3, US Customs Today.
Nelson, Lee J ICR-Based Automatic License Plate Reading for Canadian Customs, Mar. 1993, Advanced Imaging.
Computer Recognition Systems, Computer Recognition Systems, Avista (TM), 2002.

* cited by examiner

| Feature Descriptions | California | Maryland | Virginia | Texas | Louisiana |
| --- | --- | --- | --- | --- | --- |
| Small Descriptive Text Above Characters | Issue #2 Red block characters – "California" – Centered in the column direction | "Soft" script "Maryland" above characters and centered | None in IR images | "Hard" "Texas & flag" above and centered Other "soft" text such as "Truck", etc. | Special designations such as "Truck" – column centered on some plates |
| Small Descriptive Text Below Characters | None | None | None in IR images | None in IR images | Special designations such as "Private", "Commercial" – column centered on some plates |
| Relative Character Intensity versus Background | Well contrasting dark characters on light background | Normal or medium | Normal or medium | Normal or medium | Distinctively clear, clean background with heavy dark characters – extra retro-reflective |
| Character Spacing | Normal | Normal | Normal | Normal | Normal |
| Gap Spacing | No gap | Yes for some syntaxes, no for others | Yes between 3 & 4 for standard issue | Yes between 3 & 4 standard issue | Wider than most |
| Character Location Within the Plate | All characters are lower from center than normal | Normal | May be closer to left and right sides | May be closer to left and right sides | Normal |
| Known Character Syntax | Issues #1-#3 7 characters NAAANNN Issue #4 6 characters AAA NNN or NNN AAA | BBB NNN Or MNNNNNN Or NNNMNNN Or NNNNNNM Where "M" is the actual letter | LLL-NNNN | LNN LLL | "Sportsman's Paradise" passenger Issue – AAA NNN |
| Character Aspect Ratio | Unknown | Unknown – appears normal | Unknown – appears normal | Unknown – appears normal | "Stubbier" characters |
| Special Symbol for Character Group Separation | None | "Soft/medium" "coat-of-arms shield" | Hard dash | None known | None – Web of holograms may show up in images |

*FIG. 3A*

| Feature Descriptions | California | Maryland | Virginia | Texas | Louisiana |
|---|---|---|---|---|---|
| Location/Presence of Registration / Renewal Tags | 2 tags Upper left Month, upper right Year | 2 tags Upper left - month and Upper Right - year some variability in appearance, left tag more pronounced (darker) | 2 tags Upper left and right – not very reliable | None observed in IR images | Single tag containing year and month – lower right – background of tag fairly retro-reflective |
| Presence of Other Non-Retroreflective Detail on Plates | None | None | None | Yes, horse figure below and centered | None – Hologram present in center of plate at certain viewing angles |
| Character / Background Inversion | Issues #1 - #3 Dark characters on light background Issue #4 light characters on dark background | Dark characters on light background | Dark characters on light background | Dark characters on light background | Dark characters on light background |
| Plates on Front, Back, or Both | unknown | both | both | unkonwn | Back only |
| Relative Thickness of Characters Strokes (Scale 1 – 10, 10 being thickest) | 6 | 7 | thin | Bold characters - 8 | 8 |
| Presence of Specialty Characters | Open "4's" | None | None | None Known | None |
| Square-ness of Characters (Scale 1 – 10, 10 being most square) | 4 | 5 | Unknown | | 4 |

*FIG. 3B*

APPARATUS AND METHOD FOR RECOGNIZING THE STATE OF ORIGIN OF A VEHICLE LICENSE PLATE

This application claims priority to provisional patent application Ser. No. 60/917,802 titled APPARATUS AND METHOD FOR RECOGNIZING THE STATE OF ORIGIN OF A VEHICLE LICENSE PLATE filed May 14, 2007, the entire contents of which are incorporated herein by reference.

FIELD

This invention relates to analyzing various characteristics of a state-issued vehicle license plate and assessing the characteristics against characteristics stored in a database to determine the state of issuance of the plate.

BACKGROUND

Automatic License Plate Reading (ALPR) systems are used by security and law enforcement personnel to find and read vehicle license plate numbers in images produced by video cameras and still cameras. A typical ALPR system consists of a video imaging device, a video capture device and a computer running ALPR software. The video camera sends video images to the video capture device as a standard television format video signal. The video capture device converts the video signal into digital image information and stores the digital information in the computer. The computer's software then begins the ALPR process by locating the license plate in the image as represented by the digital information. If a license plate is detected in the image, the computer software performs a character recognition process to "read" the license plate number.

State governments typically issue vehicle license plates having alphanumeric characters combined with decorative design elements having various colors. The arrangement of information and design elements on the plates, including color characteristics, may be helpful in identifying the state that issued a plate. However, variations in design from state-to-state make it more difficult for ALPR systems to recognize and process the license plate number.

What is needed is a method for processing character and design information on a vehicle license plate to aid in identifying the state of issuance of the plate, and for using the state identification information in processing the license plate number.

SUMMARY

In one aspect, various embodiments described herein provide a process for using spectral properties of light reflected from a vehicle license plate to determine spectral frequency bands having the best contrast between characters and background. For example, red characters against a white background exhibit high contrast levels at wavelengths of about 420 nm to about 595 nm. Green characters against a white background exhibit high contrast levels at wavelengths of about 600 nm to about 750 nm. Blue characters against a white background exhibit high contrast levels at wavelengths of about 550 nm to about 750 nm. Thus, spectral characteristics in combination with other design-related characteristics of a license plate may be used in identifying the state of origin of the plate.

In another aspect, various embodiments provide a system for analyzing various design characteristics of a license plate, including character size, placement and color, to identify the state of issuance of the plate.

In one preferred embodiment, the invention provides an apparatus for extracting information from a vehicle license plate. The apparatus includes one or more video imaging devices for acquiring one or more images that include the vehicle license plate, where the images include color information. The apparatus also includes a license plate detection module for detecting a vehicle license plate image portion within the one or more images. A license plate characteristic database is provided for storing license plate characteristics of license plates issued by a plurality of state governments. The apparatus includes an origin determination module for determining a plurality of license plate characteristics found in the vehicle license plate image portion, for comparing the license plate characteristics found in the vehicle license plate image portion to license plate characteristics stored in the license plate characteristic database, for determining based on the comparison one or more candidate state governments from which the license plate may have issued, for processing the color information in the one or more license plate images and selecting based on the color information at least one of the candidate state governments as the state government that issued the license plate, and for generating state issue information based on the selection. An optical character recognition engine determines alphanumeric characters from the license plate image portion, and an output device outputs the alphanumeric characters and the state issue information.

In some embodiments, the apparatus includes a spectral band selection module for selecting one or more spectral bands of the license plate image portion for the optical character recognition engine to use.

In some embodiments, the syntax of the character information determined by the optical character recognition engine is adjusted based at least in part on the state issue information.

In another aspect, the invention provides a method for determining vehicle license plate information. In one embodiment, the method includes the following steps:

(a) acquiring one or more images that include a vehicle license plate, where the one or more images include color information;

(b) detecting a vehicle license plate image portion within the one or more images;

(c) determining alphanumeric characters in the license plate image portion;

(d) determining a plurality of license plate characteristics found in the vehicle license plate image portion;

(e) comparing the license plate characteristics found in the vehicle license plate image portion to license plate characteristics stored in a license plate characteristic database, where the license plate characteristic database relates license plate characteristics to states of origin;

(f) based on the comparison of step (e), determining one or more candidate state governments from which the vehicle license plate may have issued;

(g) selecting at least one of the candidate state governments as the state government that issued the license plate, wherein the selecting is based at least in part on the color information in the one or more images;

(h) determining state issue information based at least in part on the selection of step (g); and (i) outputting the alphanumeric characters and the state issue information.

In an alternative embodiment, the invention provides a method for determining vehicle license plate information which includes the following steps:
(a) acquiring one or more images that include a vehicle license plate, where the one or more images include color information;
(b) detecting a vehicle license plate image portion within the one or more images;
(c) determining a plurality of license plate characteristics found in the vehicle license plate image portion;
(d) comparing the license plate characteristics found in the vehicle license plate image portion to license plate characteristics stored in a license plate characteristic database, where the license plate characteristic database relates license plate characteristics to states of origin;
(e) based on the comparison of step (d), determining one or more candidate state governments from which the vehicle license plate may have issued;
(f) selecting at least one of the candidate state governments as the state government that issued the license plate, wherein the selecting is based at least in part on the color information in the one or more images;
(g) determining state issue information based on the selection of step (f);
(h) selecting one or more spectral bands to use in determining alphanumeric characters in the license plate image portion, wherein the selecting is based at least in part on the state issue information;
(i) determining alphanumeric characters in the license plate image portion; and
(j) outputting the alphanumeric characters and the state issue information.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein:

FIGS. 3A and 3B depict tables that list examples of features in "standard" issue plates of various states that may be used in identifying the state of origin;

DETAILED DESCRIPTION

Figure 1:
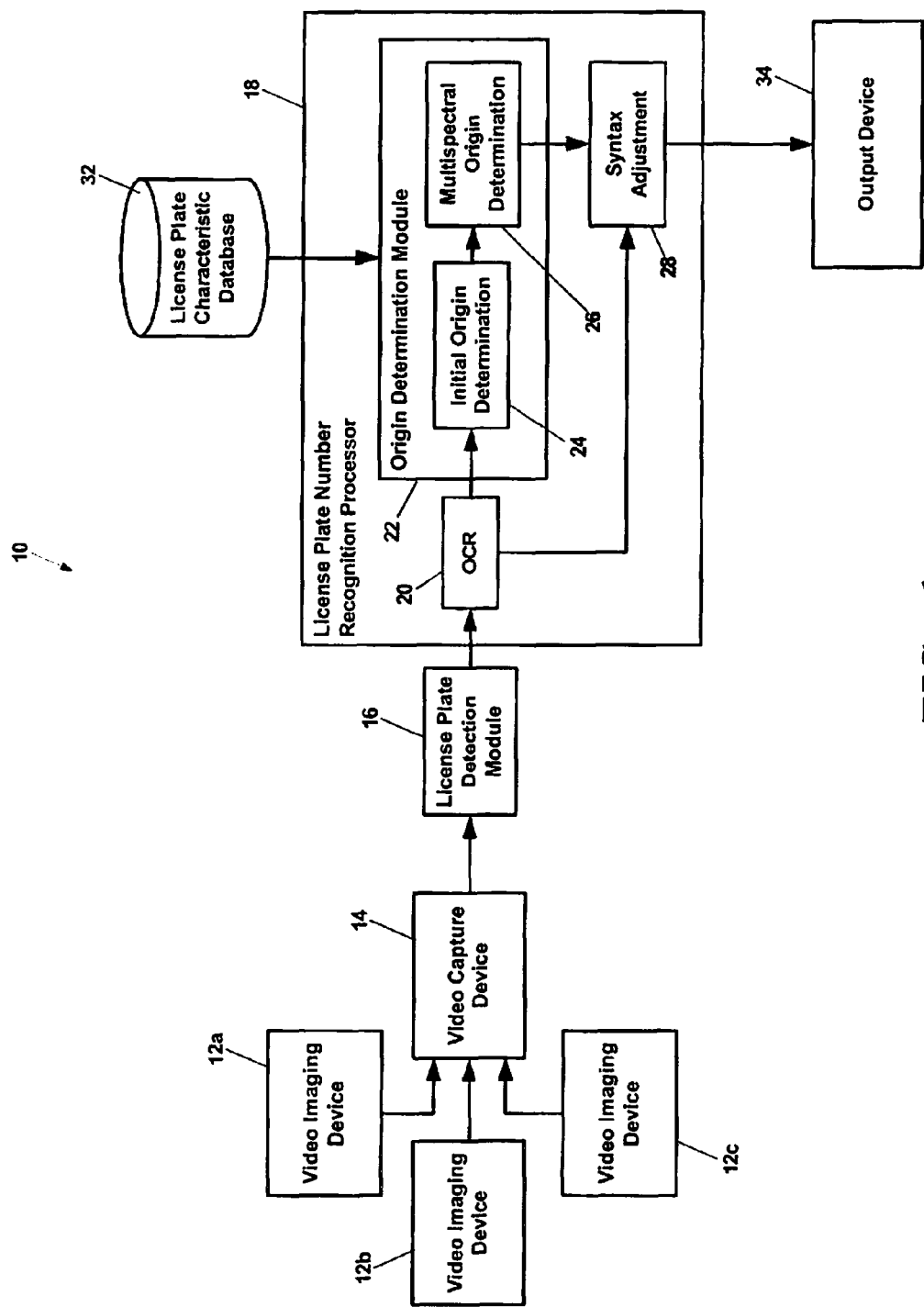
FIG. 1 depicts an automatic license plate reading system according to a preferred embodiment.
Figure 11:
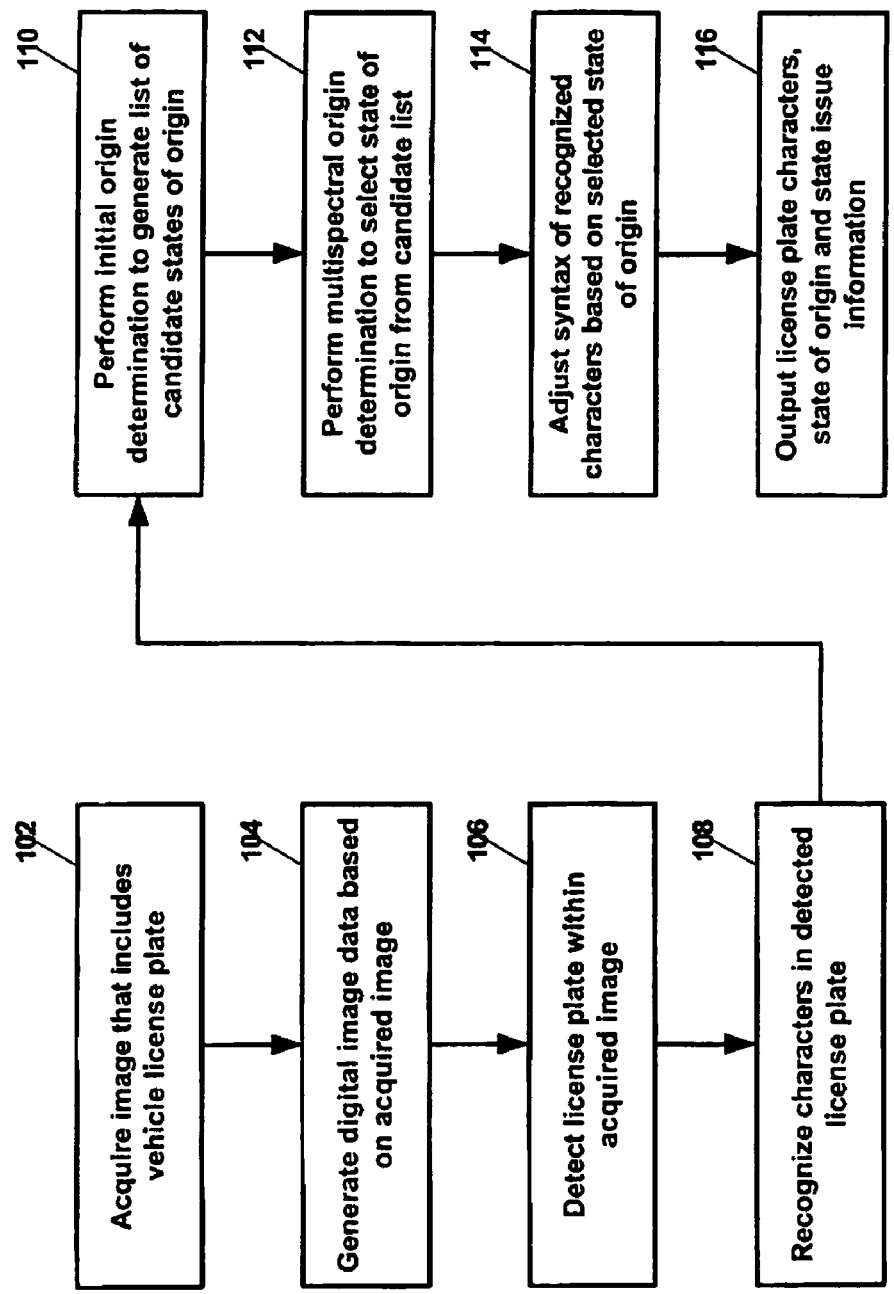
FIG. 11 depicts a method for determining license plate information according to a preferred embodiment.

FIG. 1 depicts an Automatic License Plate Reading (ALPR) apparatus 10 and FIG. 11 depicts a method for determining license plate information using the apparatus of FIG. 1. The apparatus 10 includes a video imaging device 12a, which includes video camera lenses, electro optics, sensors and electronic circuitry for receiving optical images and converting the optical images into a video or image signal (step 102 in FIG. 11). One example of the video imaging device 12a is a model number P362 video surveillance camera manufactured by PIPS Technology, Inc.

In some embodiments, multiple imaging devices 12a, 12b, 12c may be used to obtain multiple images captured using different regions of the spectrum. In some embodiments, a multi-spectral technique is applied using an imaging arrangement in which all sensors view the same scene. Such an arrangement may include color cameras (NTSC/PAL, RGB, Bayes Color, etc.) and specialty cameras (i.e. Redlake's Visible/IR). Multiple images from a single or multiple imaging devices may be used to pick out state-of-origin related information. For example, slightly under-exposed images may provide more detail of logos and symbols on a plate. Multiple images of the same plate at different exposure levels may also be used. For example, at lower exposure levels, more background detail will be present for analysis.

The apparatus 10 includes a video capture device 14 which receives the video or image signal(s) generated by the video imaging device(s) 12a-12c and generates digital data based thereon (step 104). A license plate detection module 16 receives the digital image data and locates the boundaries of a license plate within the image, if a license plate is present (step 106). The license plate detection module 16 may employ several distinct methods to locate the plate. The advantage of this arrangement is that even if one method fails to locate the plate, another method applying a different approach may still succeed.

One of the plate-finding methods locates the plate by looking for linear edges that form around a white plate when it is surrounded by a darker background. The method checks whether a quadrangular area formed by the edges meets certain conditions that make it a license plate candidate. These conditions may include size, symmetry, aspect ratio, tilt and skew. The use of infrared illumination, which provides a high contrast between the reflective plate and the non-reflecting background, creates the best conditions for this method. However, the method is effective even without infrared illumination since the white (or light-colored) plate is often set against (or is surrounded by) a darker area (e.g. a plastic frame used to mount the plate, a bumper area, a darker shade of paint on a vehicle body, etc.).

Another plate-finding method locates the plate by looking for a row of characters on a contrasting background (i.e. darker characters on a light-colored background or light-colored characters on a darker background). This method starts with scanning the image to find areas having high spatial energy (similar to the approach described in U.K. Patent No. GB2332322, the contents of which are incorporated herein by reference) and then further processes these candidate locations. This processing includes steps of dynamic thresholding, character separation, and determining the exact boundaries of the character sequence (if found). The method checks whether the sequence of characters and their dimensions meet certain conditions that qualify the image as a license plate candidate. These conditions may include the uniformity of character width and height, how well the characters align, the size and distribution of whitespace between characters, and the vertical/horizontal dimensions of the entire sequence.

The output of the license plate detection module 16 is provided to a license plate number recognition (LPNR) processor 18 which outputs a license plate number result. In a first embodiment depicted in FIG. 1, the LPNR processor 18 includes an Optical Character Recognition (OCR) engine 20, an origin determination module 22 and a syntax adjustment module 28. Each of these components of the LPNR processor 18 are described in more detail hereinafter. In one embodiment, the LPNR processor 18 may comprise a computer processor on a motherboard of a personal computer which performs the functions described hereafter based on the execution of software instructions. In another embodiment, the LPNR processor 18 may comprise a processor disposed in a special-purpose license plate recognition unit which performs the functions described hereafter based on the execution of firmware instructions.

The OCR engine 20 receives a digital image of the license plate found in a captured scene and outputs alphanumeric characters found in the license plate image, such as in ASCII format (step 108). The OCR engine 20 may operate according to various OCR techniques known in the art. For example, U.S. Pat. No. 4,817,166 describes one such technique. It will be appreciated that the invention is not limited to any particular OCR technique.

As shown in FIG. 1, the origin determination module 22 is a software or firmware routine that determines a state (or country) of origin of a license plate using a two-stage process. In an initial origin determination stage 24, various characteristics of the license plate are compared to values stored in a license plate characteristic database 32 to generate a list of candidate states of origin (step 110). Table I lists various characteristics that may be included in the database 32 and used in the initial origin determination process. In the preferred embodiment, the initial origin determination algorithms use a single set of functions to extract a fixed set of features that are useful across all plate issues.

TABLE I

| | License Plate Characteristic | Comments |
|---|---|---|
| 1 | Presence of small descriptive text above or below the main license plate characters | |
| 2 | Relative character contrast versus background | i.e., highly contrasting plates like Louisiana, and marginally contrasting plates at 950 nm like North Carolina |
| 3 | Relative spacing between characters | Normalized, average character spacing, excluding gap distances. (i.e., "123 ABC" includes the spacing between 1 and 2, 2 and 3, A and B, and B and C.) |
| 4 | Number of characters read by OCR engine | Preferably no dependency on correct character reads, but only on proper identification of characters |
| 5 | Number of gaps between character groups in character string | |
| 6 | Relative gap spacing between character groups Gap width per character span | See FIG. 6 for examples. |
| 7 | Index identification of the character to the left of each identified gap | Gaps are listed in order of left to right across the character string |
| 8 | Left-most character location within the plate | Normalized gap between left-most character and the left edge of plate |
| 9 | Right-most character location within the plate | Normalized gap between right-most character and the right edge of plate |
| 10 | Known letter or character syntax | i.e., the first three characters are always letters, right side of plate has 4 characters, etc. |
| 11 | Character height | Normalized, average |
| 12 | Character aspect ratio | i.e., height-to-width |
| 13 | Character width per character span | See FIGS. 5A and 5B for examples. |
| 13 | Special symbol for character group separation | i.e., Virginia has a dash in the middle of the plate |
| 14 | Presence of "hard" separator between character groups | Indicated by a flag. Separators include special symbols, logos, or other graphics that reliably show up in images regardless of normal image variations such as exposure, ambient conditions, size, etc. An array variable may be used for situations wherein there are multiple separators in multiple gaps. |
| 15 | Features of "hard" separators | |
| 16 | Presence/location of registration renewal tags | |
| 17 | Presence of other non-retroreflective detail on the plate | |
| 18 | Character/background inversion | Indication of dark characters on light background, or light characters on dark background |
| 19 | Presence of plates on front or rear of vehicle or both | |
| 20 | Relative thickness of character strokes | i.e., on a scale of 1-10, where 10 is thickest |
| 21 | Presence of specialty characters | |
| 22 | Squareness of characters | i.e., on a scale of 1-10, where 10 is most square |
| 23 | Type of vehicle on which plate is mounted which information is used to determine context and most likely syntax of the characters | i.e. passenger car, light truck, van, etc.; determined based on image of vehicle |

TABLE I-continued

| License Plate Characteristic | Comments |
| --- | --- |
| 24 Presence or absence of license plate on the front of a vehicle | Thirty-one of the fifty states of the United States require a license plate on both the front and back of a vehicle. The remaining nineteen states only require a back plate. |

Figure 5A:
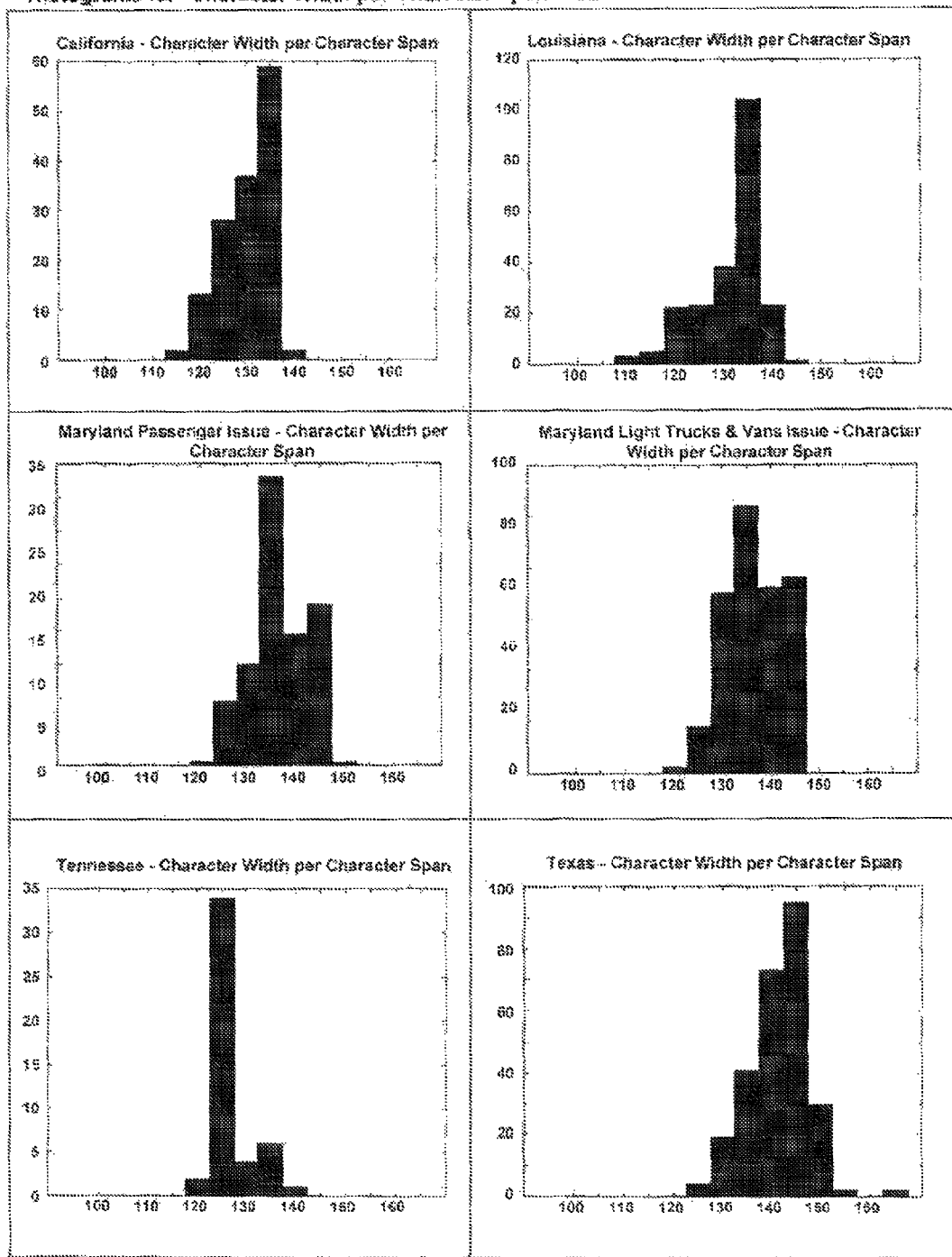
FIGS. 5A and 5B depict histograms for the "Character Width per Character Span" feature for an assortment of state license plates.
Figure 5B:
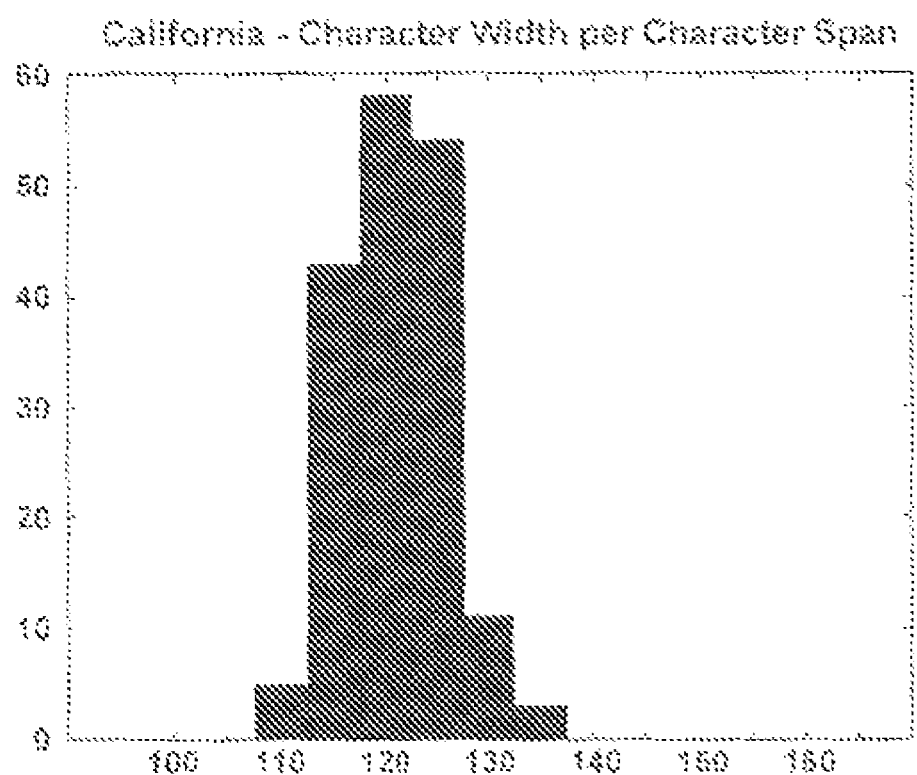
Figure 6:
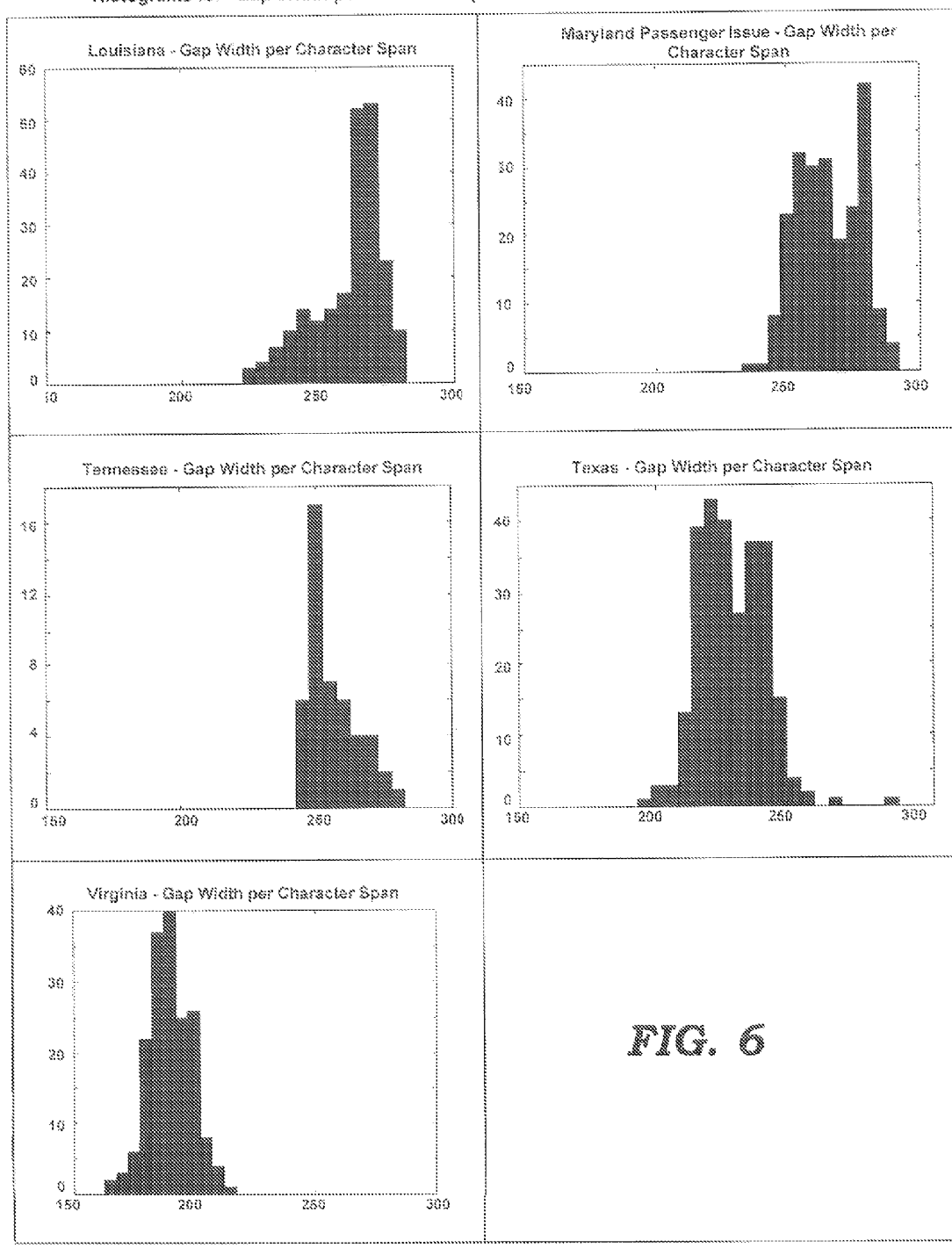
FIG. 6 depicts histograms for the "Gap Width per Character Span" feature for an assortment of state license plates.

FIGS. 3A and 3B depict tables that list examples of some of the above-listed features found in "standard" issue plates of various states. FIGS. 5A and 5B depict histograms for the "Character Width per Character Span" feature for an assortment of states. FIG. 6 depicts histograms for the "Gap Width per Character Span" feature for an assortment of states.

Figure 4:
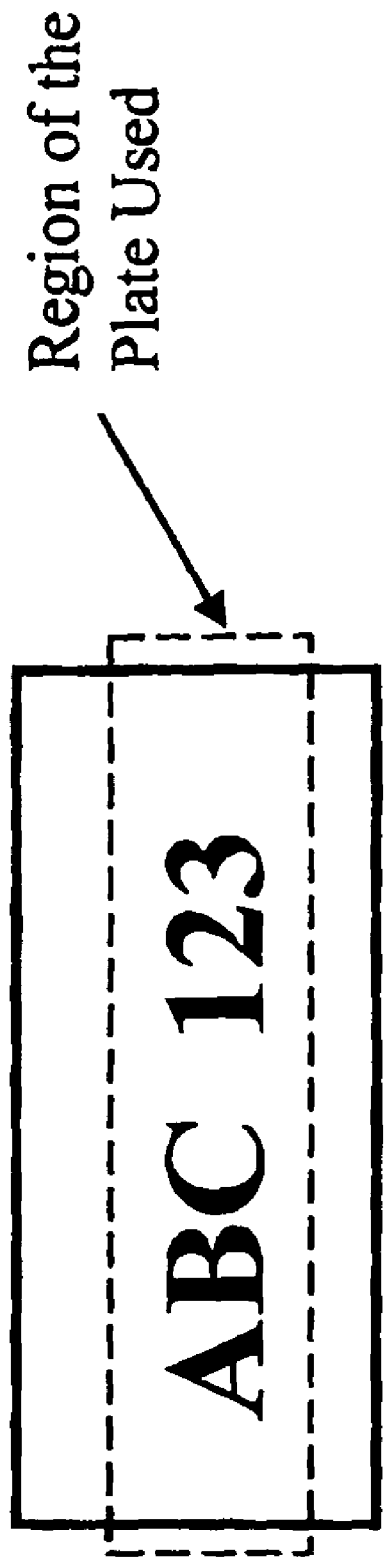
FIG. 4 depicts a region of a license plate to be analyzed.

In some embodiments, the initial origin determination stage 24 uses algorithms that operate on monochromatic, field-based images. In typical North American applications, a restricted region of the plate is used for the initial origin determination analysis. This region, as shown in FIG. 4, is considered a reliable region across most styles of plates and plate mounting arrangements.

In the embodiment depicted in FIG. 1, origin determination is performed after the OCR operation. However, because misread characters could adversely affect origin determination results, no character read syntax information from the OCR operation is used for origin determination in the preferred embodiment. If needed, the syntax adjustment module 28 can make an additional syntax adjustment to the plate read after origin determination process is completed.

In a preferred embodiment, the output of the initial origin determination module 22 is a list of candidate plate origins. This list preferably contains at least two pieces of information for each entry: (1) a high level origin category (i.e. the country, or state, or province); and (2) a plate issue identification for each category. The plate issue identification may consist of a single entry if the origin in question is highly standardized. For example, United Kingdom plates might have an origin listing of UK/Issue #1. Other origins, such as US states, might have many entries, perhaps several hundred. Tennessee/Passenger Issue 1997-2004, Tennessee/"Friends of the Smoky Mountains" Issue, Tennessee/"Kids First" Issue, and Tennessee/"UT Alumni" Issue are just a few examples of the possible Tennessee plate issues. An example output of the initial origin determination module 22 may include the following origins/issues: Maine/"Regular Passenger Issue 1997-1999", Maryland/"Regular Passenger Issue 2003", and Missouri/"Regular Passenger Issue 2000-2003".

In some embodiments, a means for separating "Specialty" plates may be provided as a precursor to the initial origin determination module 24. "Specialty" plates may include plates with logos, graphics, and/or symbols associated with a special issue of a given plate. Examples include the "Save the Manatee" issue of Florida plates and various university alumni issued plates. Also, a mechanism may be implemented to provide weighting values to the initial origin determination output in the event several origins are indistinguishable upon analysis.

The output of the initial origin determination stage 24 is provided to the multispectral origin determination stage 26 which applies specific tests for each of the candidate origin locations to provide a final indication of the plate origin (step 112). For specific testing, function pointers in a linked list may be called by a single, generic loop. In a preferred embodiment, functions are created on a one-by-one basis as user demands dictate. So that such specific tests may be dynamically added, a preferred embodiment includes a set of generic base functions. Information contained in an initialization file (i.e., a *.ini file) informs the generic base function where and what to look for in the plate image in regard to color. For example, a function testForColor( ) may test for a reddish hue at a certain location within a plate.

Figure 7A:
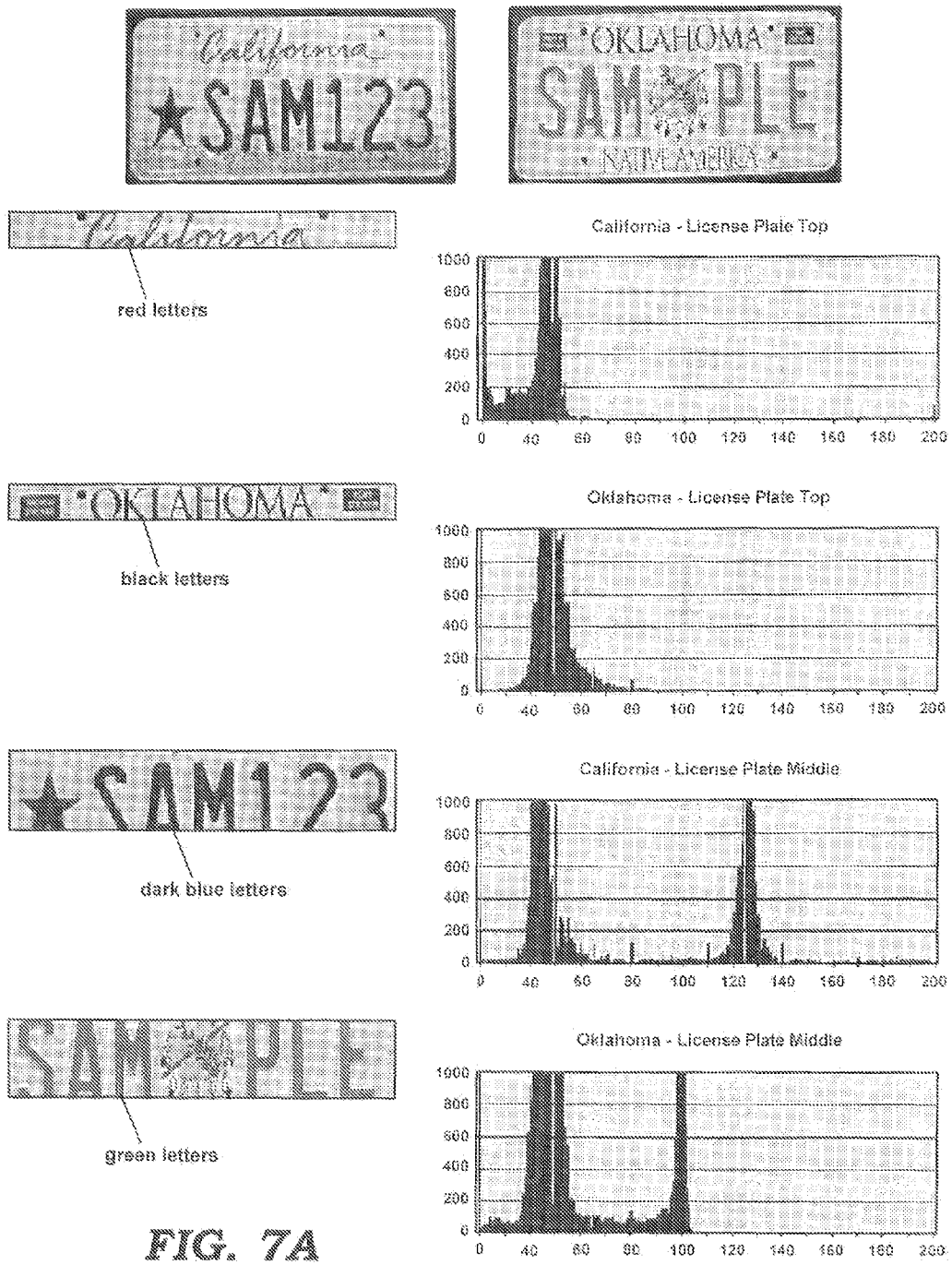
FIGS. 7A and 7B depict the use of hue information in a state of origin identification process according to a preferred embodiment of the invention
Figure 7B:
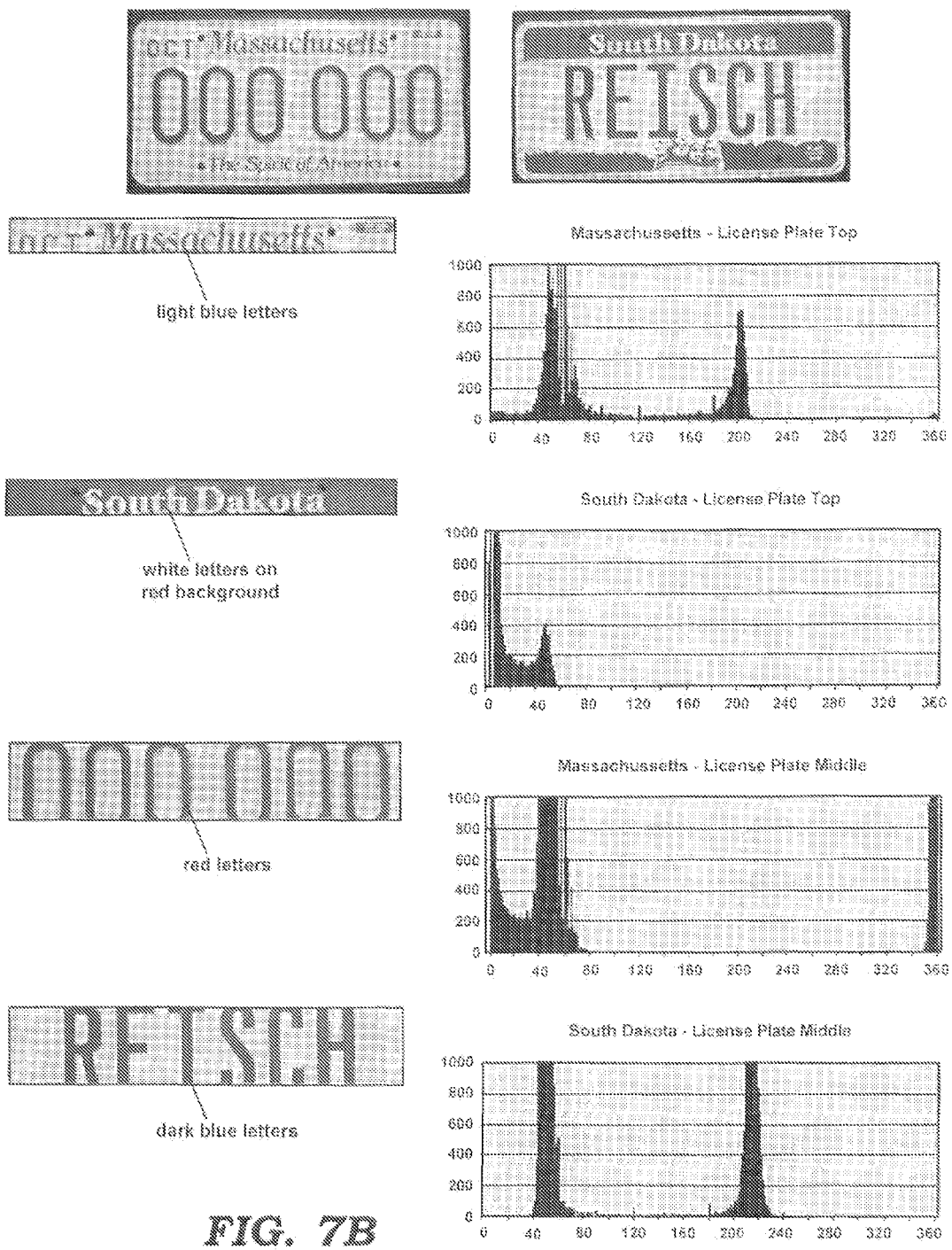

As illustrated in FIGS. 7A and 7B, the multispectral origin determination stage 26 uses hue information detected in various regions of a license plate to make a final determination of the state of origin. As indicated in FIGS. 7A and 7B, California plates include red letters in a region just above the license plate characters, Oklahoma plates have black letters in this region, Massachusetts plates have light blue letters in this region, and South Dakota plates have white letters on a red background in this region. Hue information in the central portion of the plate where the license plate characters generally appear may also be used in the multispectral origin determination stage 26. For example, the California plates have dark blue letters in this central region, Oklahoma plates have green letters in the central region, Massachusetts plates have red letters in the central region and South Dakota plates have dark blue letters in this region.

Consider an example in which Florida's "Save the Manatee" plate is one of several candidates listed in the origin candidate list generated by the initial origin determination stage 24. To determine whether the imaged plate is in fact the "Save the Manatee" plate, three tests may be performed in the multispectral origin determination stage 26. These tests would consider (1) whether the main license plate characters are "red", (2) whether a "grayish" region is present in the center of the plate, and (3) whether "greenish" regions are present just below the main license plate characters. If the output of these tests is "true," then the multispectral origin determination stage 26 generates an output indicating that the imaged plate is a Florida "Save the Manatee" plate.

As discussed above, the syntax adjustment stage 28 shown in FIG. 1 may use the output of the multispectral origin determination stage 26 to adjust the syntax of the license plate number output from the OCR engine 20 (step 114).

With continued reference to FIG. 1, the output of the license plate number recognition processor 18 is provided to an output device 34 which may comprise a display device, a printer, a storage device, a memory device or a network interface device (step 116). The output of the license plate number recognition processor 18 preferably comprises license plate characters (i.e., SAM123), a state/country of origin (i.e., California), and an issue identification (i.e., "Passenger 1989-present").

Figure 2:
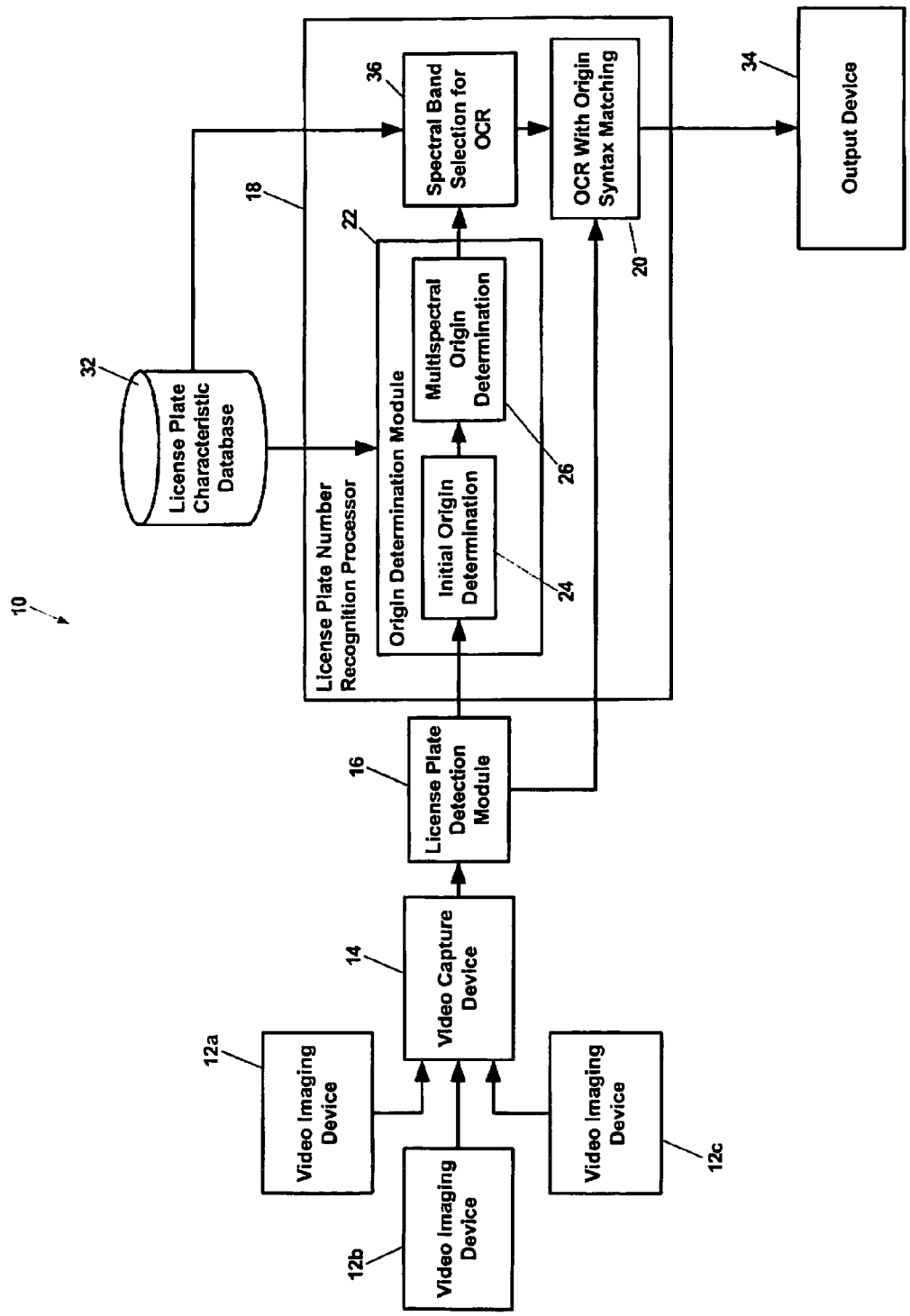
FIG. 2 depicts an automatic license plate reading system according to an alternative embodiment.
Figure 12:
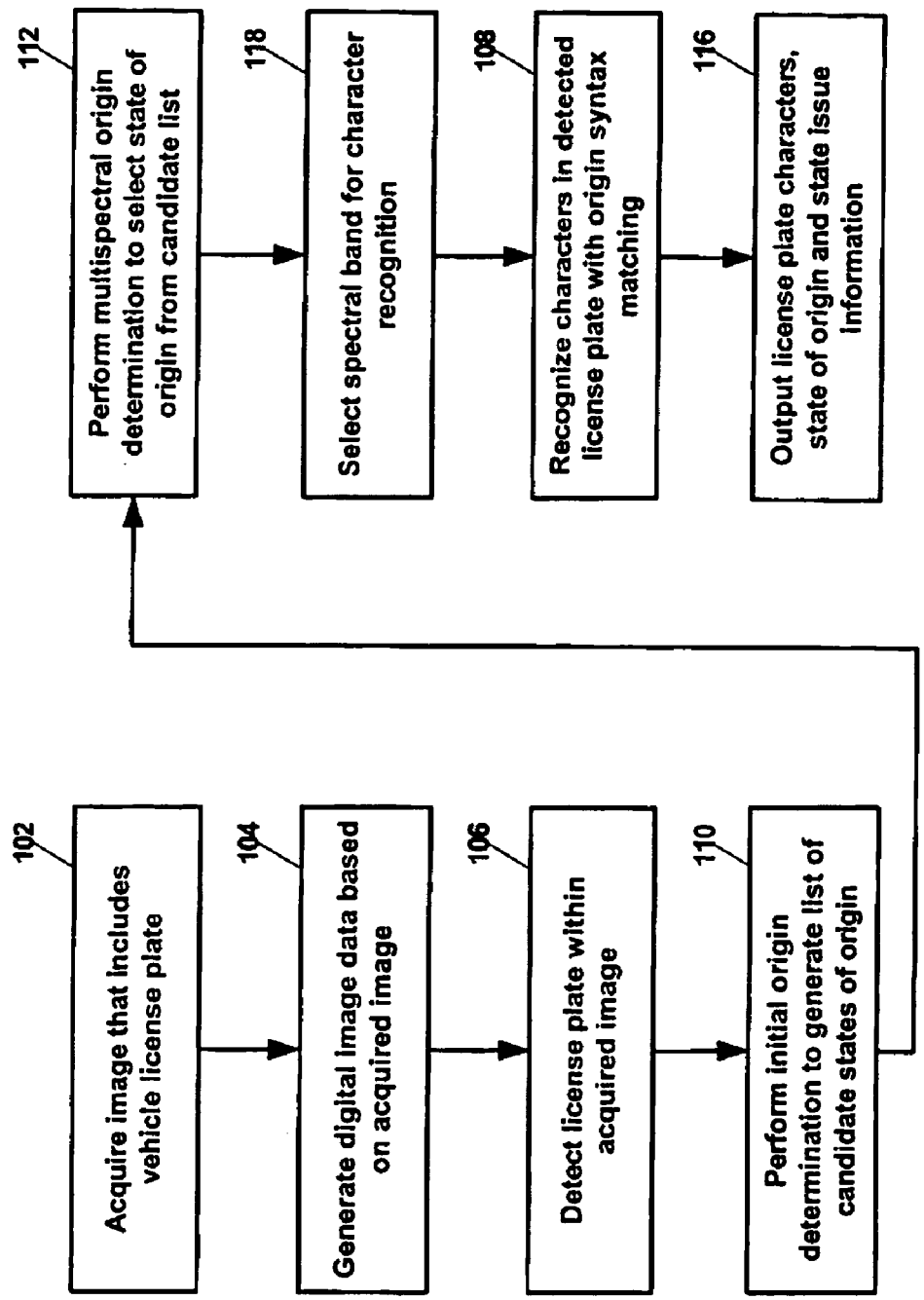
FIG. 12 depicts a method for determining license plate information according to an alternative embodiment.

FIG. 2 depicts an ALPR apparatus 10 and FIG. 12 depicts a method for determining license plate information according to an alternative embodiment. In this embodiment, origin determination (steps 110 and 112) is performed before optical character recognition (OCR) (step 108). This approach reduces the overall complexity of the algorithms and provides a more efficient process flow. Generally, the embodiment of FIG. 2 comprises the same hardware as that described above in the embodiment of FIG. 1. However, there are differences in the processing steps carried out by the license plate number recognition processor 18 as described below.

As shown in FIG. 2, the output of the origin determination module 22 is provided to a spectral band selection module 36. The spectral band selection module 36 uses the output of the origin determination module 22 to select which spectral band of the plate image to use in the OCR processing engine 20 (step 118 in FIG. 12). Generally, the spectral band selection module 36 selects the spectral band that provides the best character-to-background contrast for the imaged plate.

Figure 8:
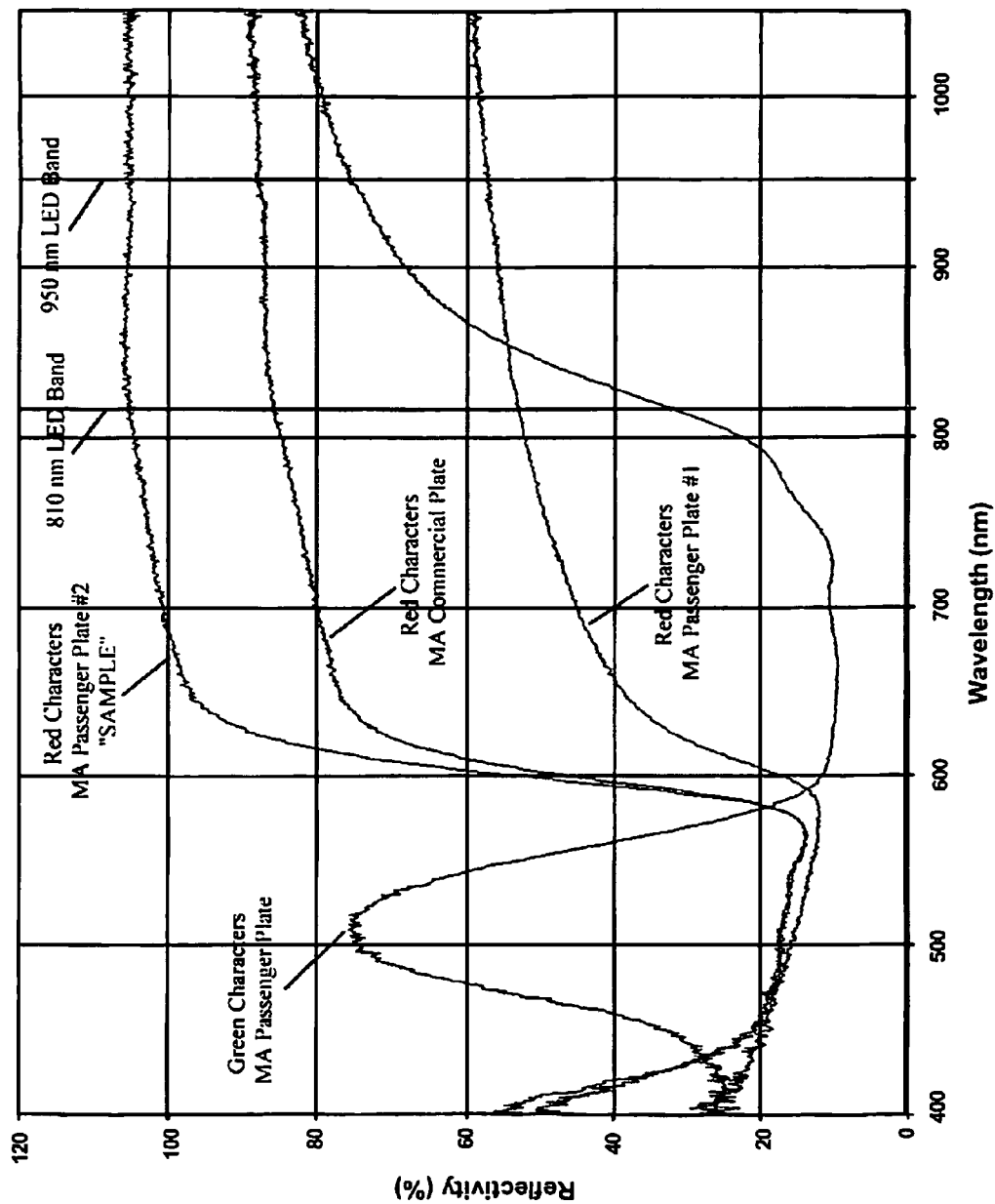
FIG. 8 depicts reflected spectrum information from red and green alphanumeric characters on various vehicle license plates issued by the State of Massachusetts.
Figure 9:
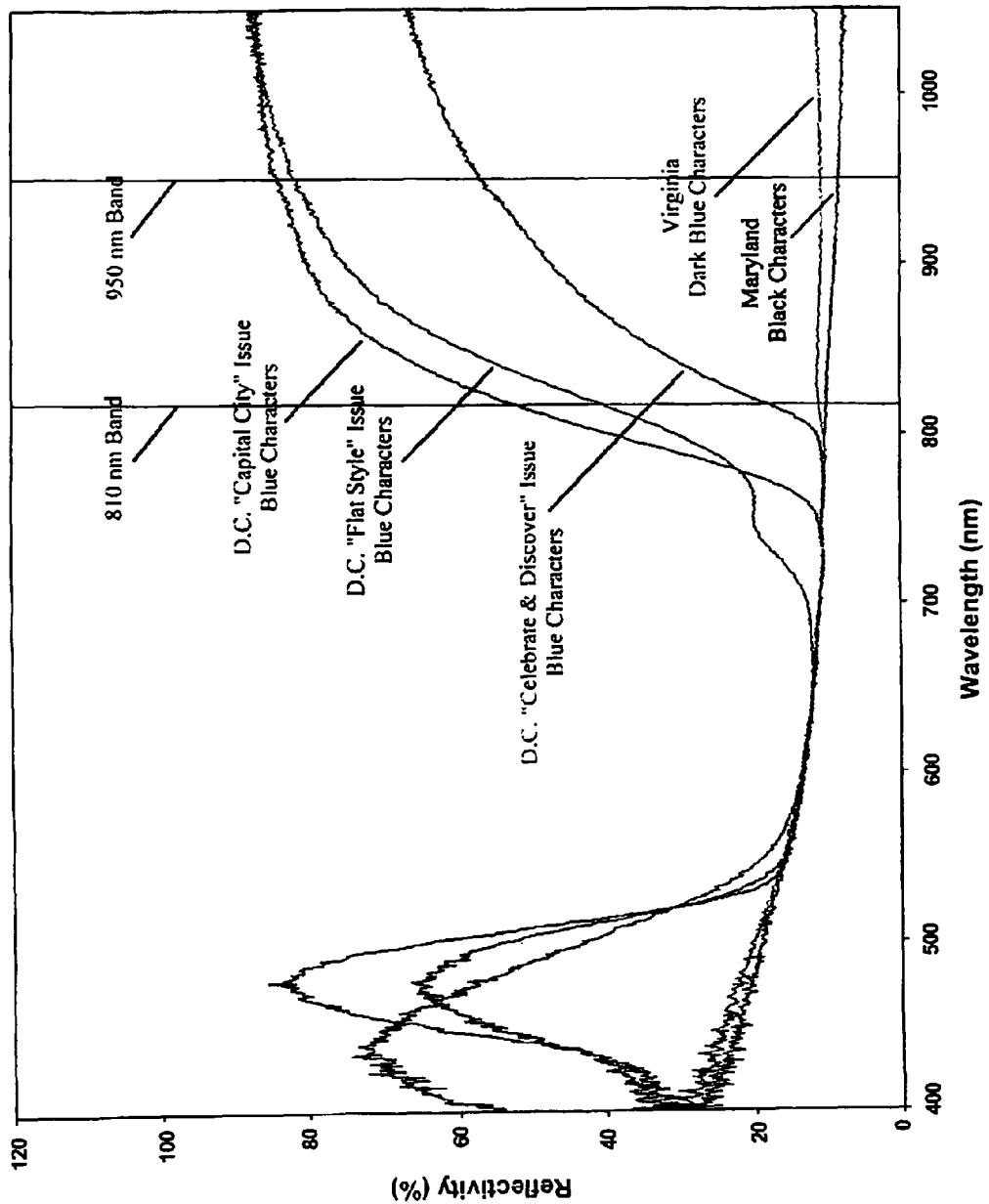
FIG. 9 depicts reflected spectrum information from blue and black alphanumeric characters on various vehicle license plates issued in Washington D.C.

FIGS. 8 and 9 depict spectral measurements made on alphanumeric characters on various vehicle license plates in the 400 nm through 1050 nm wavelength range. To establish a reference level, an initial measurement of a white "background" region of a single plate was also taken. Accordingly, the spectral information shown in FIGS. 8 and 9 provide a direct measure of contrast between characters and background. Generally, lower retro-reflectivity from the characters at a given wavelength provides greater contrast. Based on the data shown in FIGS. 8 and 9, it is apparent that spectral bands can be selected based on license plate origin and issue information to provide maximum contrast between characters and background.

For example, spectral testing on various license plate has established the following: (1) For reading Massachusetts plates with red-characters, a spectral band from about 420 nm through 595 nm provides good contrast; (2) For Massachusetts plates that include green and red characters, only a narrow band from about 560 nm through 590 nm provide good contrast for both styles of plates; (3) In Washington D.C. area plates, which include Maryland and Virginia, a wide spectral band exists from about 515 nm through 800 nm that provides good contrast for all plate styles involved.

In preferred embodiments of the invention, such license plate spectral contrast information is stored in the license plate characteristic database 32 and is available for access by the spectral band selection module 36. Thus, if the output of the origin determination module indicates that the origin/issue of an imaged plate is Massachusetts/Passenger #2, the spectral band selection module 36 accesses the license plate characteristic database 32 and determines that this plate should be OCR processed using a spectral band from about 420 nm through 595 nm. Based on this information, the OCR engine 20 operates on an image of the plate filtered for the selected range.

A neural network implementation for the recognition of state of origin for license plates has been demonstrated. The demonstration included plates from six states: California, Louisiana, Maryland, Tennessee, Texas and Virginia. Poor quality images and unusual plates such as vanity and specialty plates were considered outliers and were eliminated from the data set of the demonstration. An attempt was made to include all of the "main" issue plates for a given state. For example, Maryland has a standard issue passenger plate with a syntax XXX YYY, and also issues plates with a separate syntax for vans, SUV's, and light trucks. A total of 54 to 301 plate images from the various states were included in the final data set. A "Venetian blinds" technique was used to separate neural network training data from test data.

Plate features considered in the demonstration are features that are generally available on all license plate images. These features, which were selected to be as invariant as possible to scale, exposure, and orientation included: (1) ratio of the average character spacing to average character height, (2) number of characters, (3) number of gaps, (4) location of gaps, (5) space of gaps as a ratio of gap with over average character height, (6) presence of a "hard" gap separator, (7) match of character spacing to a known state syntax, (8) match of syntax to known syntax for a given state, (9) special syntax match above and beyond the initial syntax match, (10) actual character for each location within a plate, (11) average character aspect ratio, and (12) average character widths.

Figure 10:
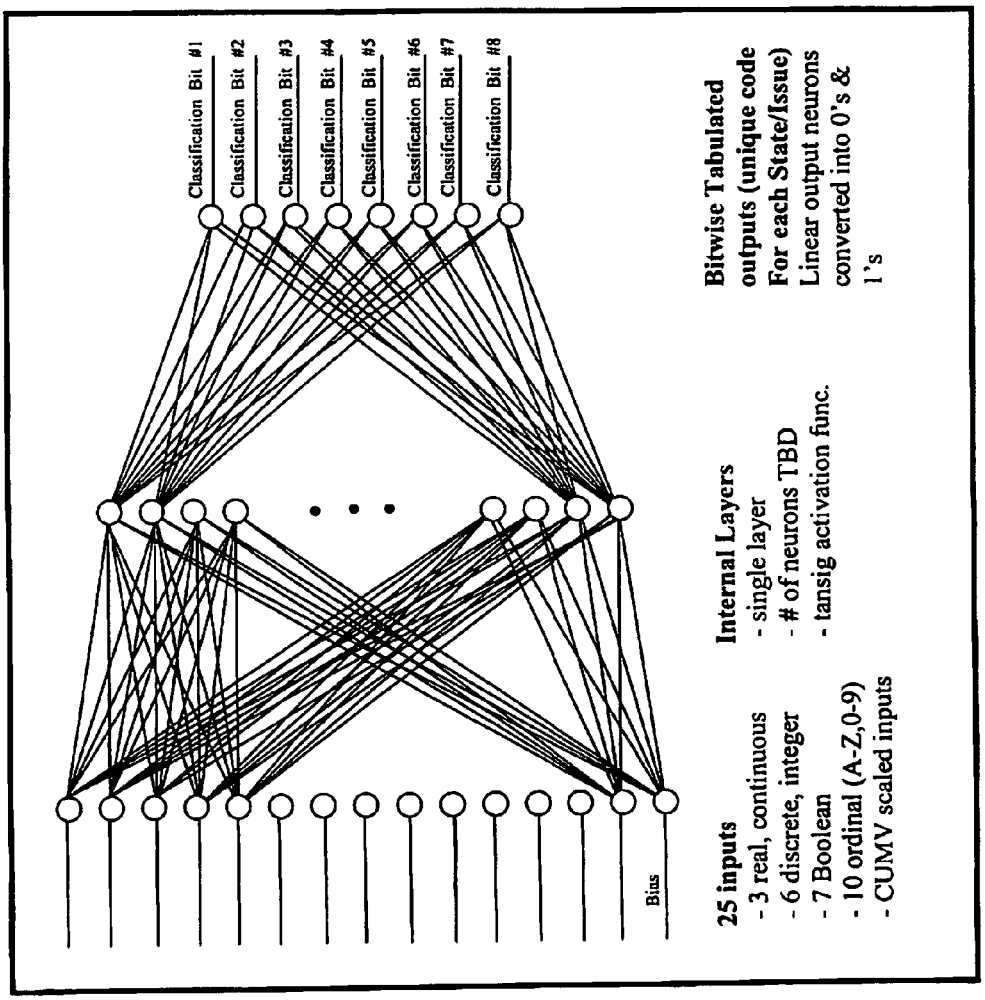
FIG. 10 depicts a neural network architecture arrangement that incorporates a back propagation network with supervised learning according to a preferred embodiment of the invention.

FIG. 10 depicts a neural network architecture that incorporates a back propagation network with supervised learning according to a preferred embodiment of the invention. Table II lists classification bit values for various state plate issues.

TABLE II

| Origin Description | Bit 1 | Bit 2 | Bit 3 | Bit 4 | Bit 5 | Bit 6 | Bit 7 | Bit 8 |
|---|---|---|---|---|---|---|---|---|
| California - Issue #1 | 1 | 0 | 0 | 0 | 0 | 0 | 0 | 0 |
| Louisiana - Issue #1 | 0 | 1 | 0 | 0 | 0 | 0 | 0 | 0 |
| Maryland - Issue #1 | 1 | 1 | 0 | 0 | 0 | 0 | 0 | 0 |
| Maryland - Issue #2 | 0 | 0 | 1 | 0 | 0 | 0 | 0 | 0 |
| Tennessee - Issue #1 | 1 | 0 | 1 | 0 | 0 | 0 | 0 | 0 |
| Texas - Issue #1 | 0 | 1 | 1 | 0 | 0 | 0 | 0 | 0 |
| Virginia - Issue #1 | 1 | 1 | 1 | 0 | 0 | 0 | 0 | 0 |

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for extracting information from a vehicle license plate, comprising:

one or more imaging devices for acquiring one or more images that include the vehicle license plate, where the one or more images include color information;

a license plate detection module for detecting a vehicle license plate image portion within the one or more images;

a license plate characteristic database for storing license plate characteristics of license plates issued by a plurality of state governments;

an origin determination module for determining a plurality of license plate characteristics found in the vehicle license plate image portion, for comparing the license plate characteristics found in the vehicle license plate image portion to license plate characteristics stored in the license plate characteristic database, for determining based on the comparison multiple candidate state governments from which the vehicle license plate may have issued, for each of the multiple candidate state governments, applying a color test that is specific to the candidate state government, wherein each color test detects whether a particular color is present in a particular location in the vehicle license plate image portion, for selecting, based at least in part on the particular color detected in the particular location in the vehicle license plate image portion, at least one of the candidate state governments as the state government that issued the license plate, and for generating state issue information based on the selection;

an optical character recognition engine for determining alphanumeric characters from the license plate image portion; and an output device for outputting the alphanumeric characters and the state issue information.

2. The apparatus of claim 1 further comprising:

a spectral band selection module for selecting one or more spectral bands of the license plate image portion; and the optical character recognition engine uses the one or more spectral bands in determining alphanumeric characters.

3. The apparatus of claim 2 wherein the spectral band selection module uses information generated by the origin determination module in selecting the one or more spectral bands of the license plate image portion for use by the optical character recognition engine.

4. The apparatus of claim 2 wherein the spectral band selection module selects the one or more spectral bands of the license plate image portion that provide an optimal character-to-background contrast.

5. The apparatus of claim 1 further comprising a syntax adjustment module for adjusting syntax of the alphanumeric characters based at least in part on the state issue information.

6. The apparatus of claim 1 wherein the origin determination module generates state issue information that includes the state of origin of the license plate and information indicating an issue series of the license plate.

7. The apparatus of claim 1 wherein the one or more imaging devices acquire multiple images of the vehicle license plate, wherein each image is acquired in a different region of the spectrum.

8. The apparatus of claim 1 wherein the optical character recognition engine determines the alphanumeric characters before the origin determination module determines the license plate characteristics found in the vehicle license plate image portion, and wherein the origin determination module determines the license plate characteristics based at least in part on the alphanumeric characters determined by the optical character recognition engine.

9. The apparatus of claim 1 wherein the optical character recognition engine determines the alphanumeric characters after the origin determination module determines the license plate characteristics found in the vehicle license plate image portion, and wherein the optical character recognition engine determines the alphanumeric characters based at least in part on the license plate characteristics determined by origin determination module.

10. A method for determining vehicle license plate information, comprising:

(a) acquiring one or more images that include a vehicle license plate, where the one or more images include color information;

(b) detecting a vehicle license plate image portion within the one or more images;

(c) determining alphanumeric characters in the license plate image portion;

(d) determining a plurality of license plate characteristics found in the vehicle license plate image portion;

(e) comparing the license plate characteristics found in the vehicle license plate image portion to license plate characteristics stored in a license plate characteristic database, where the license plate characteristic database relates license plate characteristics to states of origin;

(f) based on the comparison of step (e), determining multiple candidate state governments from which the vehicle license plate may have issued;

(g) for each of the multiple candidate state governments determined in step (f), applying a color test that is specific to the candidate state government, wherein each color test detects whether a particular color is present in a particular location in the vehicle license plate image portion;

(h) selecting at least one of the candidate state governments as the state government that issued the license plate, wherein the selecting is based at least in part on the particular color detected in the particular location in the vehicle license plate image portion;

(i) determining state issue information based at least in part on the selection of step (h); and (j) outputting the alphanumeric characters and the state issue information.

11. The method of claim 10 further comprising adjusting syntax of the alphanumeric characters based at least in part on the state issue information.

12. The method of claim 10 wherein step (i) includes determining state issue information that includes a state of origin of the license plate and information indicating an issue series of the license plate.

13. The method of claim 10 wherein step (a) includes acquiring multiple images of the vehicle license plate, wherein each image is acquired in a different region of the spectrum.

14. A method for determining vehicle license plate information, comprising:

(a) acquiring one or more images that include a vehicle license plate, where the one or more images include color information;

(b) detecting a vehicle license plate image portion within the one or more images;

(c) determining a plurality of license plate characteristics found in the vehicle license plate image portion;

(d) comparing the license plate characteristics found in the vehicle license plate image portion to license plate characteristics stored in a license plate characteristic database, where the license plate characteristic database relates license plate characteristics to states of origin;

(e) based on the comparison of step (d), determining one or more candidate state governments from which the vehicle license plate may have issued;

(f) selecting at least one of the candidate state governments as the state government that issued the license plate, wherein the selecting is based at least in part on the color information in the one or more images;

(g) determining state issue information based on the selection of step (f);

(h) selecting one or more spectral bands to use in determining alphanumeric characters in the license plate image portion, wherein the selecting is based at least in part on the state issue information;

(i) determining alphanumeric characters in the license plate image portion; and (j) outputting the alphanumeric characters and the state issue information.

15. The method of claim 14 wherein step (h) comprises selecting the one or more spectral bands that provide an optimal character-to-background contrast for determining alphanumeric characters in the license plate image portion.

16. The method of claim 14 wherein step (i) includes performing character syntax matching based at least in part on the state issue information.

17. The method of claim 14 wherein step (g) includes determining state issue information that includes a state of origin of the license plate and information indicating an issue series of the license plate.

18. The method of claim 14 wherein step (a) includes acquiring multiple images of the vehicle license plate, wherein each image is acquired in a different region of the spectrum.

* * * * *